Figure 1:
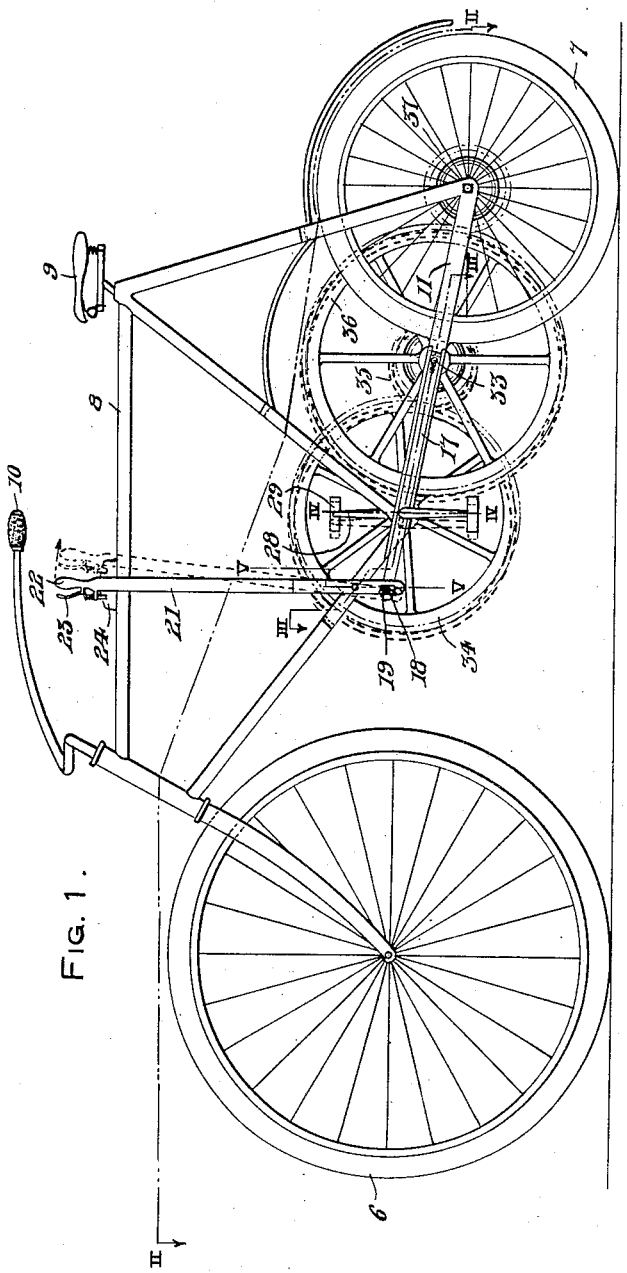

K. CHROBAK.
BICYCLE.
APPLICATION FILED SEPT. 19, 1919.

1,332,709.

Patented Mar. 2, 1920.
2 SHEETS—SHEET 1.

Inventor
K. Chrobak

By A. M. Wilson
Attorney

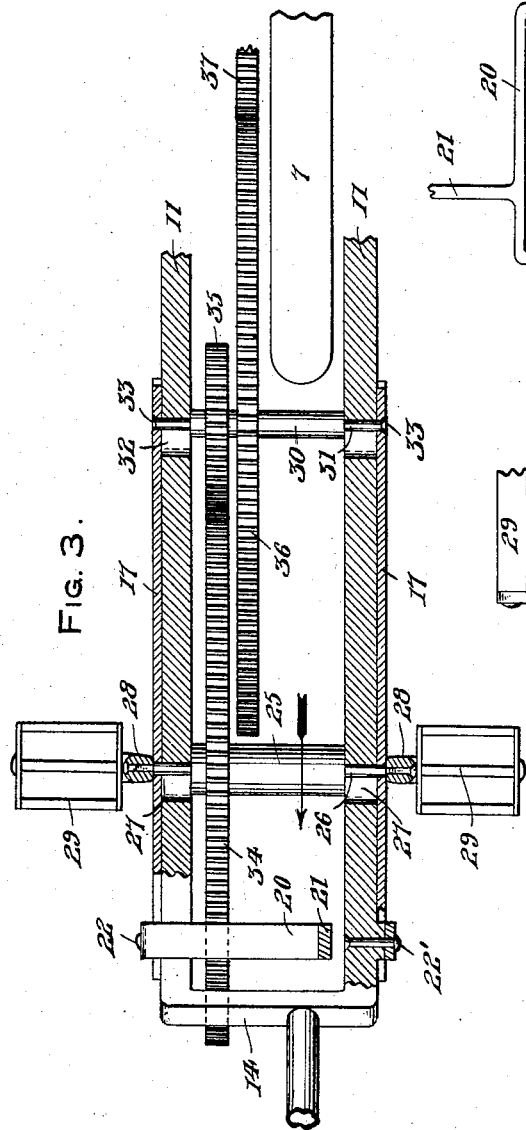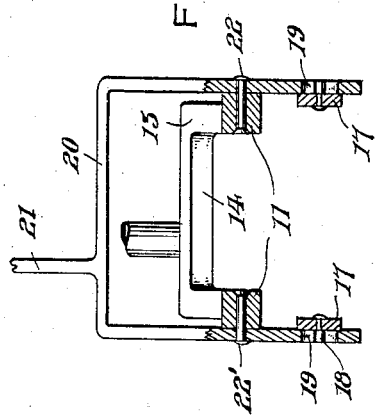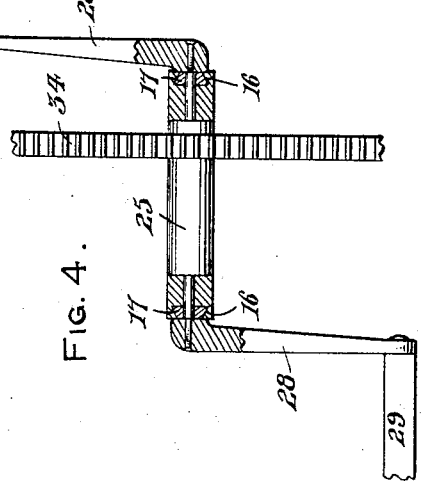

UNITED STATES PATENT OFFICE.

KAZIMIER CHROBAK, OF ROSEMONT, WEST VIRGINIA.

BICYCLE.

1,332,709.  Specification of Letters Patent.  Patented Mar. 2, 1920.

Application filed September 19, 1919. Serial No. 324,856.

*To all whom it may concern:*

Be it known that I, KAZIMIER CHROBAK, a citizen of Poland, residing at Rosemont, in the county of Taylor and State of West Virginia, have invented certain new and useful Improvements in Bicycles, of which the following is a specification.

The primary object of the present invention resides in the provision of a novel propulsion mechanism for bicycles wherein there is provided a plurality of meshing gears to be employed in lieu of the ordinary type of chain drive and wherein the propulsion mechanism is rendered inoperative by shifting the same out of driving contact with the traction wheel, rendering the propulsion mechanism inoperative at the time of riding downhill, thus to relieve the rider of unnecessary exertion, the propulsion mechanism being shiftable into operative position at the will of the operator, whereupon the pedal cranks are again operative for forwardly propelling the bicycle.

With the above and other objects in view, the invention consists in the novel form, combination and arrangement of parts herein fully described and shown in the accompanying drawings, wherein like reference characters indicate similar parts throughout the several views.

Figure 2:
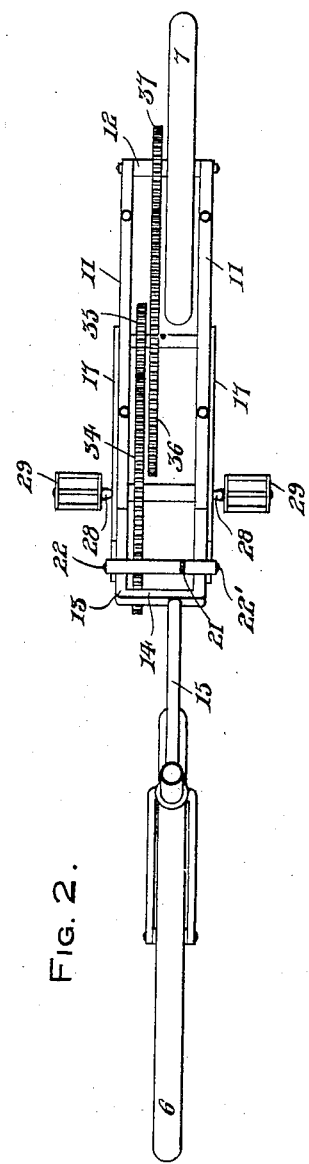

In the drawings,

Figure 1 is a side elevational view of a bicycle constructed in accordance with the present invention, the driving mechanism being shown in shifted inoperative position by dotted lines, Fig. 2 is a horizontal sectional view taken on line II—II of Fig. 1 from the bicycle frame and above the driving mechanism, Fig. 3 is a horizontal fragmentary sectional view taken on line III—III of Fig. 1 showing a portion of the driving mechanism and supporting frame, therefor, Fig. 4 is a cross sectional view taken on line IV—IV of Fig. 1 showing the interlocking connection between the bicycle frame and mechanism carrying frame slidable thereon, and Fig. 5 is a cross sectional view taken on line V—V of Fig. 1 showing the operating lever for shifting the mechanism supporting frame.

Referring more in detail to the accompanying drawings and particularly to Fig. 1, there is illustrated a bicycle embodying front and rear wheels 6 and 7 supporting a bicycle frame 8 provided with an ordinary seat 9 and steering handle bars 10, the frame being of unusual design including a pair of spaced parallel side bars 11 having the rear axle 12 for the rear wheel 7 journaled in the rear ends thereof while the forward ends of the side bars 11 are upwardly inclined as at 13 and connected by the cross piece 14 carrying the forward member 15 of the bicycle frame 8.

As shown more clearly in Figs. 3 and 4, the outer faces of the side bars 11 are provided with dove-tailed longitudinally extending seats or grooves 16 into which are slidably received the dove-tailed strips 17, the forward ends of which project forwardly of the side bars 11, the same being provided upon their forward ends with pins 18 slidable in the grooved lower ends 19 of a fork 20 carried by the lower end of a shifting lever 21, the lever being pivoted as indicated in Figs. 1 and 5 to the inclined forward extensions 13 of the side bars 11 at the points 22'. As shown in Fig. 1, the upper end of the lever 21 is provided with a hand grip 22 carrying a spring pressed latch 23 coöperating with a rack segment 24 supported on the horizontal bar of the frame 8 for purposes of holding the shifting lever in adjusted positions.

The driving mechanism for the rear wheel 7 is shown more clearly in Fig. 3 and includes a crank shaft 25 having reduced ends 26 slidable through oppositely positioned slots 27 provided in the opposite side bars 11, the reduced ends 26 extending through openings provided in the strips 17 and having secured upon the projecting ends thereof the pedal cranks 28 carrying an ordinary form of pedal 29. A shaft 30 extends transversely of the side bars 11 and is provided with reduced ends 31 projecting through slotted openings 32 in said side bars with the outer ends of the reduced ends 31 fixed as at 33 to the side strips 17. A relatively large gear 34 is fixed to the crank shaft 25 inwardly of the side bars 11 and is in mesh with a pinion 35 fixed to the transverse shaft 30, the shaft 30 also carrying a relatively large gear 36 in mesh with the pinion 37 fixed to the rear axle 12 of the bicycle.

With the driving mechanism in the full line position shown in Fig. 1, with the lever 21 forwardly positioned and retained by the latch 23, power from the crank shaft 25 generated by the pedals 29 is communicated through the meshing gears above described to the rear axle pinion 37. At times, where it is desired to move forwardly without positively driving the bicycle, as in descending a hill, the lever 21 is shifted on its pivotal connection 22' with the forward extension 13 of the side bars 11, this pivotal movement being permitted upon releasing the latch 23 from the rack 24, and during which movement the side strips 17 connected to the lower end of the forked member 20 upon the lever 21 as at 18 and 19, will move forwardly in the dove-tailed recess 16 and carry therewith the crank shaft 25 and transverse shaft 30 connected thereto, the two shafts 25 and 30 sliding through the slotted openings 27 and 32 in the side bars 11, during which movement the gear 36 is disconnected from the pinion 37 upon the rear axle 12 while the remaining gears 34 and 35 remain in constant mesh. By reversing the movement of the lever 21 at the desired time, the driving mechanism is again brought into communication with the rear axle pinion 37 and the forward propulsion of the bicycle is again accomplished by the operation of the pedal mechanism described.

While there is herein shown and described what is believed to be the preferable embodiment of the invention, it is nevertheless to be understood that minor changes may be made in the form, combination and arrangement of parts without departing from the spirit and scope of the invention as claimed.

What is claimed as new is:—

1. A device of the class described comprising a bicycle frame, spaced parallel bars carried by said frame, a rear axle journaled in said bars, a rear supporting wheel carried by said axle, a forward wheel for said frame, strips slidably associated with the side bars, a lever pivoted to said bars with the end connected to the strips for shifting the same, a crank shaft slidably supported in said frame and journaled in said strips, and meshing gears interposed between the crank shaft and the rear axle and supported on said side strips.

2. A bicycle of the type described including a frame, supporting wheels therefor, spaced side bars forming a part of said frame, a rear axle journaled in said side bars, a pinion fixed to said axle, a pair of strips slidably associated with said side bars, driving gears slidable in said side bars and journaled in said strips, a lever having a forked lower end pivoted to said side bars with the lower ends of the fork connected to the forward ends of said strips for shifting the strips and driving gears journaled therein.

3. A bicycle of the type described including a frame, supporting wheels therefor, said frame including a pair of spaced side bars, said side bars having oppositely arranged slotted openings therein, transverse shafts slidable in said openings, meshing gears on said shafts, a driven pinion immovably mounted relative to said side bar, means slidable on said side bars and through which the transverse shafts are journaled and means pivoted to the side bars and connected to the means slidable thereon for shifting the last named means to cause the transverse shafts and gear supported thereon to be moved relatively to the fixed pinion.

4. A bicycle of the type described including a frame, supporting wheels therefor, said frame including a pair of spaced side bars, said side bars having oppositely arranged slotted openings therein, transverse shafts slidable in said openings, meshing gears on said shafts, a driven pinion immovably mounted relative to said side bar, means slidable on said side bars and through which the transverse shafts are journaled, means pivoted to the side bars and connected to the means slidable thereon for shifting the last named means to cause the transverse shafts and gear supported thereon to be moved relatively to the fixed pinion, and pedal cranks fixed to one of said shafts.

In testimony whereof I affix my signature.

KAZIMIER CHROBAK.